(No Model.)
E. LOUDEN
EGG POACHER.
No. 601,755. Patented Apr. 5, 1898.
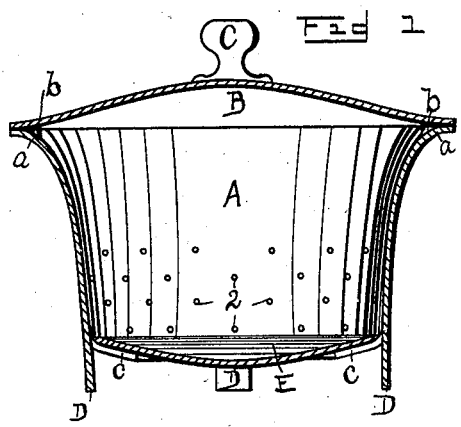
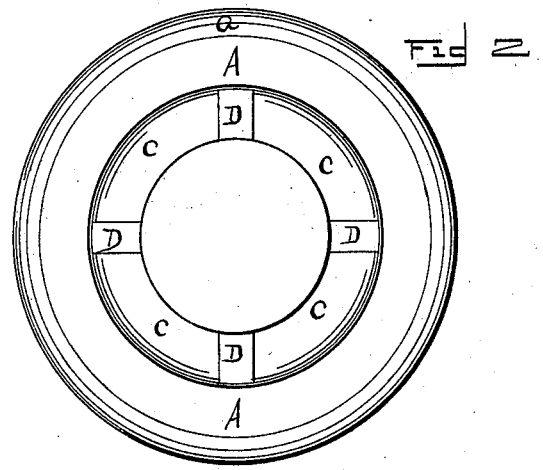
WITNESSES:
A. M. Elkjer.
C. A. Hiss.
Elizabeth Louden
INVENTORESS
BY G. W. Sues
ATTORNEY.
THE NORRIS PETERS CO., PHOTO-LITHO., WASHINGTON, D. C.

UNITED STATES PATENT OFFICE.

ELIZABETH LOUDEN, OF OMAHA, NEBRASKA.

EGG-POACHER.

SPECIFICATION forming part of Letters Patent No. 601,755, dated April 5, 1898.

Application filed July 19, 1897. Serial No. 645,070. (No model.)

*To all whom it may concern:*

Be it known that I, ELIZABETH LOUDEN, residing at Omaha, in the county of Douglas and State of Nebraska, have invented certain useful Improvements in Egg-Poachers; and I do hereby declare that the following is a full, clear, and exact description of the invention, such as will enable others skilled in the art to which it appertains to make and use the same, reference being had to the accompanying drawings, which form a part of this specification.

This invention relates to an improvement in egg-poachers.
The object of my invention is to provide an egg-poacher more particularly adapted to poach individual orders, and the device is peculiarly adapted to be used in hospitals and homes.
In the accompanying drawings, Figure 1 shows a sectional central view of an egg-poacher embodying my invention, while Fig. 2 shows a top view thereof with the lid removed.
The aim of my invention is to provide a simple utensil that is more particularly adapted to be used as an egg-poacher, but which can also be used as a jelly-mold.

My device comprises, essentially, an approximately cylindrical blank A, stamped in any suitable shape, though I prefer to have the upper end flaring outward, as is shown at *a*. Below I have an inwardly-extending flange C, from which are stamped the tongues D D, which extend in a line with the vessel proper to form legs upon which the vessel rests, while the flange C is adapted to receive a suitable bottom E. The bottom E is preferably slightly dished and nicely fits into the receptacle A, so that after the egg is poached it can be readily removed by carrying the bottom E upward. A suitable lid B is further provided with one or more projections *b*, so that it neatly fits upon the receptacle. Now the body of the receptacle is further provided with a series of perforations 2, which do not extend upward beyond the center of the receptacle proper.

As far as described this device would embrace my invention, and when used as a jelly-mold the jelly can, of course, be readily carried outward by means of pressing the bottom E upward from below.

The bottom E, when the device is used as a jelly-mold, can be provided with a design, so that when the jelly is placed in an inverted position it will disclose the impress of the mold.

The device is neat and simple and can be easily cleaned and is inexpensive; and,

Having thus described my said invention, what I claim as new, and desire to secure by United States Letters Patent, is—

As an article of manufacture, an egg-poacher consisting of a perforated body flared upwardly, portions of its lower edge being turned inwardly to form supporting-flanges, the remaining portions forming legs, and a removable bottom adapted to rest on said flanges.

In testimony whereof I affix my signature in presence of two witnesses.

ELIZABETH LOUDEN.

Witnesses:
   ANE M. ELKJER,
   G. W. SUES.